Patented Feb. 16, 1954

2,669,713

UNITED STATES PATENT OFFICE 2,669,713

METHOD OF REGENERATING ANION EXCHANGE RESINS

Roy H. Osmun, Midland, Mich., assignor to The Dow Chemical Company, Midland, Mich., a corporation of Delaware No Drawing. Application October 27, 1950, Serial No. 192,618

3 Claims. (Cl. 210—24)

This invention concerns an improved method of regenerating an anion exchange resin to its basic form. It relates more particularly to procedure for converting a strongly basic anion exchange resin, containing quaternary ammonium groups, to its basic or hydroxide form, after the resin has absorbed its capacity of ions, and pertains especially to the removal of absorbed silica from such resin.

The demineralization of water for industrial purposes such as for use in boiler feed waters, in the manufacture of chemicals, and for use in other chemical processes has become an important problem in recent years. Methods of demineralizing water are well known. One such method involves treatment of the water with ion exchange materials, wherein the water is first treated or contacted with a cation exchange agent in hydrogen form to absorb metallic ions such as calcium, magnesium and sodium ions of the dissolved salts and release hydrogen ions into the water with formation of acids corresponding to the salts. The water thus acidified is passed through a bed of an anion exchange material in basic form capable of absorbing or neutralizing the acid by releasing hydroxyl ions into the water in exchange for the anions of the acid, thereby forming pure water. During such operation the ion exchange materials lose their exchange capacity, i. e. a bed of ion exchange material becomes exhausted by absorption of its capacity of ions. The exchange capacity can be restored by regeneration, i. e. by contact of the ion exchange agent with a suitable regenerant solution which, in the case of the cation exchange agent, or resin, is a suitable mineral acid such as an aqueous solution of sulfuric acid or hydrochloric acid and, in the case of the anion exchange resin, is an alkali such as sodium carbonate, sodium bicarbonate, potassium hydroxide, or sodium hydroxide, of suitable concentration.

The sequential treatment of water with a cation exchange agent in its hydrogen form and an anion exchange resin which is a quaternary ammonium base, i. e. a water-insoluble anion exchange resin containing quaternary ammonium hydroxide groups, is usually effective to remove, from the water, dissolved solutes such as calcium bicarbonate, magnesium sulfate, calcium sulfate, calcium chloride, sodium chloride, sodium sulfate, magnesium bicarbonate and silica ($SiO_2$).

While silica is readily removed from water by absorption on a strongly basic anion exchange resin containing quaternary ammonium groups, which resin when immersed in its hydroxide form in approximately ten times its volume of a saturated aqueous solution of sodium chloride brings the latter to a pH of 10 or higher, the absorbed silica is difficult to remove from the exhausted resin during regeneration of the same by usual treatment with an aqueous solution of an alkali metal hydroxide, e. g. an aqueous 4 weight per cent solution of sodium hydroxide. It frequently requires a large excess of the alkali and also prolonged washing of a bed of the resin with the alkali metal hydroxide solution to successfully regenerate or completely remove the absorbed silica from the resin during regeneration. If the silica is not completely removed from the anion exchange resin during regeneration to its hydroxide form by treatment with an aqueous alkali metal hydroxide solution, the remaining silica is displaced from the anion exchange resin by contact with the acidified water from the cation exchange resin during the next cycle of operations with resultant leakage of silica into the treated water.

It is an object of the invention to provide a method of regenerating a strongly basic anion exchange resin to its basic or hydroxide form which avoids the difficulties just mentioned. Another object is to provide a method of regenerating a strongly basic anion exchange resin containing quaternary ammonium groups to its hydroxide form so as to remove rapidly and efficiently the absorbed anions, including silica, from the resin. A further object is to provide an improved method of regenerating to its hydroxide form, a water-insoluble anion exchange resin which is a salt of a quaternary ammonium base. Other and related objects will become apparent from the following description of the invention.

According to the invention, a strongly basic anion exchange resin containing quaternary ammonium groups which resin has absorbed its capacity of anions, including silica, can readily be regenerated to its basic form so as to displace rapidly and in an efficient manner the absorbed anions with hydroxyl ions, by treating the exhausted resin with an aqueous solution of an alkali metal hydroxide, preferably sodium hydroxide, at an elevated temperature, suitably at a temperature of 90° F. or higher, but below that at which the anion exchange resin is deteriorated. By carrying out the regenerating operation at an elevated temperature of at least 90° F., the silica ($SiO_2$) absorbed by the resin is not only displaced more rapidly and more completely by hydroxyl ions from the aqueous alkali metal hydroxide solution, but regeneration of the resin to its hydroxide form is accomplished with a lesser amount of the alkali metal hydroxide than when the regeneration is carried out at a lower temperature, e. g. a temperature of 60° F.

The anion exchange resins with which the invention is particularly concerned are the water-insoluble strongly basic anion exchange resins containing quaternary ammonium groups, i. e., a vinyl aromatic resin which is a quaternary ammonium base, or a salt thereof. Such anion exchange resins and a method of making the same are described and claimed in U. S. Patent No. 2,591,573. Briefly, the anion exchange resins may be prepared by reaction of a halomethylating agent such as chloromethyl methyl ether on a vinyl aromatic resin, e. g. a benzene-insoluble copolymer of styrene and divinylbenzene, in the presence of zinc chloride as a halomethylating catalyst, while the resin in granular form is dispersed in, or swollen by, an excess of the halomethylating agent, or by an organic liquid which is inert to the resin and is less reactive than the resin with the halomethylating agent, and thereafter reacting the halomethylated vinyl aromatic resin with a tertiary amine, e. g. trimethylamine or dimethylethanolamine.

The alkali metal hydroxide to be employed in regenerating the anion exchange resin to its basic form (after absorbing its capacity of anions) is preferably sodium hydroxide, but potassium hydroxide may also be used. The alkali metal hydroxide is usually employed as an aqueous solution containing from one to four per cent, preferably from two to four per cent, by weight of the alkali metal hydroxide.

The anion exchange resin should not be treated with the alkali regenerant solution at elevated temperatures for a time such as to cause deterioration of the resin. In general, the anion exchange resin may be contacted with the alkali solution at temperatures between 90° and 120° F. over a period of from one to one and one-half hours, without deteriorating.

In reactivating a strongly basic anion exchange resin containing quaternary ammonium groups by treating the same with a dilute aqueous sodium hydroxide solution, e. g. a 2 weight per cent solution, at a temperature of 95° F., it has been observed that the absorbed anions such as chloride, carbonate, sulfate, or silica ions, are displaced almost quantitatively with hydroxyl ions by contacting the resin over a period of from one to one and one-half hours with an amount of the alkali solution corresponding to from 2 to 2.5 pounds of the sodium hydroxide per cubic foot of the resin bed.

In practice, the anion exchange resin, after absorbing its capacity of anions, including silica, is reactivated or regenerated to its basic or hydroxide form by contacting the exhausted resin in any usual way with an aqueous solution of an alkali metal hydroxide of suitable concentration and at a temperature of at least 90° F. such as by passing a stream of the aqueous alkali solution through a bed of the resin or by immersing the resin in the alkali solution. Following the regeneration, the anion exchange resin is rinsed with water and is then ready for re-employment to purify a further amount of water.

The method herein disclosed is particularly adapted for use in regenerating strongly basic anion exchange resins to their hydroxide form in connection with the demineralization of water by use of cation and anion exchange agents, wherein silica is removed from the water by absorption on a strongly basic anion exchange resin containing quaternary ammonium hydroxide groups.

The method may be used to displace silica, together with other absorbed anions, from any strongly basic anion exchange resin which is capable of absorbing silica ($SiO_2$) from aqueous solutions. As previously mentioned, silica is readily absorbed from water by a basic anion exchange resin which when immersed in its hydroxide form in approximately 10 times its volume of an aqueous saturated solution of sodium chloride brings the latter to a pH of 10 or higher. The more strongly basic anion exchange resins containing quaternary ammonium groups, e. g. a water-insoluble vinyl aromatic resin containing quaternary ammonium hydroxide groups, which when tested as just mentioned reaches an equilibrium at a pH value of 12, or higher are particularly effective in removing dissolved silica from water.

The following example illustrates a way in which the principle of the invention has been applied, but is not to be construed as limiting the invention.

Example

A system comprising a pair of ion exchangers, one consisting of a bed of a cation exchange resin and the other being a bed of a strongly basic anion exchange resin containing quaternary ammonium groups, was employed to demineralize water, including the removal of silica. The cation exchange resin was a sulfonated copolymer of styrene and divinylbenzene. It was in the form of granules passing through a 20 mesh per inch standard Tyler screen and retained on a 50 mesh screen. The resin in its hydrogen form had a cation exchange capacity equivalent to 45,000 grains of calcium carbonate per cubic foot of the resin bed. The anion exchange resin was obtained by halomethylating a granular, benzene-insoluble copolymer of 6 per cent by weight of divinylbenzene, 9 per cent of ethylvinylbenzene and 85 per cent of styrene and reacting the halomethylated polymer with dimethylethanolamine. The anion exchange resin was in the form of granules of a size such as to pass through a 20 mesh per inch screen but be retained on a 50 mesh screen. The resin in its hydroxide form had an anion exchange capacity equivalent to 27,000 grains of calcium carbonate per cubic foot of the resin bed. Five cubic centimeters of the anion exchange in its hydroxide form, when immersed in 50 cubic centimeters of an aqueous saturated solution of sodium chloride brought the latter to a pH of 13. Each of the ion exchange resins was placed in a separate 6 inch diameter glass tube to form a resin bed 4.5 feet deep. Each bed contained approximately 0.75 cubic foot of resin. The beds were connected in series with suitable inlets and outlets for passing fluids therethrough. The cation exchange resin was converted to its hydrogen form by treating the same with an aqueous 10 weight per cent solution of hydrochloric acid and was rinsed with water. The anion exchange resin was converted to its hydroxide form by contacting the resin with an aqueous 1 normal solution of sodium hydroxide and was rinsed with water. Thereafter, a raw water containing dissolved solutes in amounts corresponding to the following:

| | Parts per million |
|---|---|
| Calcium (Ca) | 30 |
| Magnesium (Mg) | 8 |
| Chloride (Cl) | 10 |
| Sulfate ($SO_4$) | 12 |
| Bicarbonate ($HCO_3$) | 105 |
| Hardness as $CaCO_3$ | 102 |
| Silica ($SiO_2$) | 1.7 | was passed downflow at temperatures between 50° and 60° F. into contact with the cation exchange resin at a rate corresponding to 1.18 gallons of the water per minute, then deaerated to reduce the dissolved carbon dioxide to an amount corresponding to from 3 to 5 parts of the carbon dioxide per million parts of the water and was passed into contact with the anion exchange resin to remove the anions of the dissolved solutes, including silica. The effluent water flowing from the anion exchange resin bed contained less than 0.05 part of silica ($SiO_2$) per million parts of the water and had a conductivity corresponding to 0.5 part of sodium chloride per million parts of the water. The effluent water had a pH of 8.5. After absorbing anions, including silica ($SiO_2$), in total amount corresponding to about 15,000 grains of $CaCO_3$ per cubic foot of the resin bed, the anion exchange resin was regenerated by contacting the same with an aqueous 0.5 normal solution of sodium hydroxide at a temperature of 95° F. over a period of 90 minutes. The sodium hydroxide solution was employed in amount corresponding to 2.5 pounds of the sodium hydroxide per cubic foot of the resin and was passed through the bed of resin at a rate corresponding to a flow of about 0.125 gallon of the sodium hydroxide solution per minute. The bed of anion exchange resin was then rinsed with water. Substantially all of the absorbed silica, together with other absorbed ions, was removed from the resin during the regenerating operation. When the anion exchange resin had again absorbed its capacity of anions, it was regenerated by procedure similar to that described above, except that the sodium hydroxide solution was employed at a temperature of 60° F. Only 45 per cent of the absorbed silica was removed from the anion exchange resin in this instance. During subsequent cycles of operation, treatment of the anion exchange resin with an aqueous 2 weight per cent solution of sodium hydroxide at a temperature of 95° F. over a period of one hour, in amount corresponding to 2.5 pounds of the sodium hydroxide per cubic foot of the resin, as just mentioned, was effective in removing as much silica from the resin during regeneration as was absorbed by the resin from the water during the previous cycle of operations. In other words, all, or nearly all, of the silica absorbed from the water by the anion exchange resin was displaced from the resin during reactivation of the same by treating the resin with the sodium hydroxide solution at a temperature of 95° F. whereas, at a temperature of 60° F. only about 45 per cent of the absorbed silica was displaced from the resin by a similar amount of the sodium hydroxide.

Other modes of applying the principle of the invention may be employed instead of those explained, change being made as regards the step or steps herein employed, provided the step or steps stated in any of the following claims or the equivalent of such step or steps be employed.

I claim:
1. In a process which comprises removing dissolved silica from an aqueous solution by contacting the solution with a strongly basic anion exchange resin containing quarternary ammonium hydroxide groups, which anion exchange resin is composed of the reaction product of a halomethylated benzene-insoluble copolymer of a monovinyl aromatic hydrocarbon and a divinyl aromatic hydrocarbon with a tertiary amine, whereby the dissolved silica is absorbed on the anion exchange resin, the step which consists in thereafter contacting the anion exchange resin with an aqueous solution of an alkali metal hydroxide in concentration of from one to four per cent by weight at a temperature of from 90° to 120° F. whereby the absorbed silica is displaced from the anion exchange resin and said resin is regenerated to its hydroxide form.

2. In a water-demineralization process, involving a removal of dissolved silica from the water, by contacting the water first with a cation exchange resin in its hydrogen form and then with a strongly basic anion exchange resin containing quaternary ammonium hydroxide groups, which anion exchange resin is composed of the reaction product of a halomethylated benzene-insoluble copolymer of a monovinyl aromatic hydrocarbon and a divinylaromatic hydrocarbon with a tertiary amine, whereby the dissolved silica is absorbed on the anion exchange resin, the step which consists in thereafter contacting the anion exchange resin with an aqueous solution containing from one to four per cent by weight of sodium hydroxide at a temperature of from 90° to 120° F., whereby the absorbed silica is displaced from the anion exchange resin and said resin is regenerated to its hydroxide form.

3. A process as claimed in claim 2 wherein an aqueous solution containing from two to four per cent by weight of sodium hydroxide is employed to displace the absorbed silica from the anion exchange resin and regenerate said resin to its hydroxide form.

ROY H. OSMUN.

References Cited in the file of this patent

UNITED STATES PATENTS

| Number | Name | Date |
|---|---|---|
| 2,228,514 | Griessbach et al. | Jan. 14, 1941 |
| 2,467,523 | Dudley | Apr. 19, 1949 |
| 2,503,769 | Roberts | Apr. 11, 1950 |
| 2,543,666 | Michael | Feb. 27, 1951 |

OTHER REFERENCES

Calise and Lane, Silica Removal by an Improved Ion Exchange Process, Chemical Engineering Progress, vol. 44, No. 4, April 1948, pp. 269–274.